(12) United States Patent
Nakanishi et al.

(10) Patent No.: US 8,632,920 B2
(45) Date of Patent: Jan. 21, 2014

(54) AIR SECONDARY BATTERY

(75) Inventors: Shinji Nakanishi, Mishima (JP);
Fuminori Mizuno, Susono (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 219 days.

(21) Appl. No.: 12/676,111

(22) PCT Filed: Nov. 27, 2008

(86) PCT No.: PCT/JP2008/071543
§ 371 (c)(1),
(2), (4) Date: Apr. 20, 2010

(87) PCT Pub. No.: WO2010/061452
PCT Pub. Date: Jun. 3, 2010

(65) Prior Publication Data
US 2011/0200892 A1    Aug. 18, 2011

(51) Int. Cl.
*H01M 8/22* (2006.01)
(52) U.S. Cl.
USPC ............ 429/403; 429/407; 429/402; 429/405
(58) Field of Classification Search
USPC .................................. 429/407, 402, 403, 405
See application file for complete search history.

(56) References Cited

U.S. PATENT DOCUMENTS

| | | | | |
|---|---|---|---|---|
| 3,897,267 A | * | 7/1975 | Tseung et al. | 607/35 |
| 2003/0134190 A1 | * | 7/2003 | Ishida et al. | 429/162 |
| 2004/0241537 A1 | * | 12/2004 | Okuyama et al. | 429/86 |
| 2008/0318103 A1 | * | 12/2008 | Tsuji et al. | 429/27 |

FOREIGN PATENT DOCUMENTS

| | | |
|---|---|---|
| JP | 08-329962 A | 12/1996 |
| JP | 9-500480 | 1/1997 |
| JP | 2002-015737 A | 1/2002 |
| JP | 2002-015782 A | 1/2002 |
| JP | 2005-166685 A | 6/2005 |
| JP | 2005-228605 A | 8/2006 |
| JP | 2007-157445 A | 6/2007 |

* cited by examiner

*Primary Examiner* — Joseph S Del Sole
*Assistant Examiner* — David N Brown, II
(74) *Attorney, Agent, or Firm* — Kenyon & Kenyon LLP (57) ABSTRACT

A main objective of the present invention is to provide an air secondary battery which can suppress the deterioration in charge-discharge properties caused by the oxygen generated in an air cathode layer at the time of charge. The present invention solves the problems by providing an air secondary battery which comprises: an air cathode which has an air cathode layer containing a conductive material and an air cathode current collector which collects current of the air cathode layer; an anode which has an anode layer containing an anode active material and an anode current collector which collects current of the anode layer; and a permeation preventing layer which is formed on the surface of the side of the anode layer of the air cathode layer, made of a nonaqueous polymer electrolyte, and which prevents the permeation of the oxygen generated in the air cathode layer at the time of charge.

9 Claims, 4 Drawing Sheets

AIR SECONDARY BATTERY

This is a 371 national phase application of PCT/JP2008/071543 filed 27 Nov. 2008, the contents of which are incorporated herein by reference.

TECHNICAL FIELD

The present invention relates to an air secondary battery which can suppress the deterioration in charge-discharge properties caused by the oxygen generated in an air cathode layer at the time of charge.

BACKGROUND ART

The air secondary battery using a nonaqueous liquid electrolyte is a secondary battery using air (oxygen) as a cathode active material and has advantages including high energy density and easy reduction in size and weight. Therefore, currently, it has been attracting attention as a high-capacity secondary battery better than widely-used lithium secondary batteries.

The air secondary battery comprises: an air cathode layer having, for example, a conductive material (e.g., carbon black), a catalyst (e.g., manganese dioxide), and a binder (e.g., polyvinylidene fluoride), an air cathode current collector which collects current of the air cathode layer, an anode layer containing an anode active material (e.g., metal Li), an anode current collector which collects current of the anode layer, and a nonaqueous liquid electrolyte which conducts a metal ion (e.g., Li ion).

Conventionally, the air secondary battery which utilizes oxygen in the atmosphere has been known as a source of oxygen to be used at the time of discharge. Usually, the air secondary battery has an opening portion in a battery case. At the time of discharge, oxygen is supplied from the opening portion. At the time of charge, oxygen is evacuated from the opening portion. With reference to the air secondary battery focused on the evacuation of oxygen, for example, Patent Document 1 discloses the air secondary battery which has a gas discharge hole in the battery case and the hole discharges gas generated in the battery case. The technique prevents excessive carbon dioxide intake from the atmosphere and excessive water loss from the battery by devising such as the shape of the gas discharge hole.

On the other hand, an air battery in which a carboxymethyl cellulose-based polymer layer is provided between a cathode catalyst layer (air cathode layer) and the separator is disclosed in Patent Document 2. The technique involves the process of reducing the battery internal resistance by bonding the cathode catalyst layer and the separator with the carboxymethyl cellulose-based polymer layer. As an example of the conventional air cathode layers, a cathode (air cathode layer) which is based on a carbonaceous material in which the pore volume occupied by pores having a diameter of 1 nm or more is 1.0 ml/g or more is disclosed in Patent Document 3.

Patent Documents 1: Japanese translation of PCT International Application No. 9-500480
Patent Document 2: Japanese Patent Application Laid-Open (JP-A) No. 2007-157445
Patent Document 3: JP-A No. 2002-15737

DISCLOSURE OF THE INVENTION

Problems to be Solved by the Invention

In conventional air secondary batteries, there is a problem that when the charge-discharge is repeatedly performed, charge-discharge properties (e.g., a discharged capacity maintenance ratio) thereof are deteriorated. Various factors are considered as the cause. The cause due to the oxygen generated in the air cathode layer at the time of charge is considered as one of the factors. The present invention has been achieved in view of the above-mentioned circumstance, and a main objective thereof is to provide the air secondary battery which can suppress the deterioration in charge-discharge properties caused by the oxygen generated in the air cathode layer at the time of charge.

Means for Solving the Problem

In order to solve the problems, the present inventors have intensively examined them. As a result, the cause of the deterioration in charge-discharge properties is considered to be the inhibition of the ionic conduction at an interface caused by the accumulation of bubbles of oxygen generated in the air cathode layer at the time of charge at the interface between the air cathode layer and the electrolyte layer. Then, they have found that the deterioration in charge-discharge properties can be controlled by providing a permeation preventing layer which prevents the accumulation of bubbles of oxygen at the interface between the air cathode layer and the electrolyte layer. The present invention has been made based on the findings.

That is, the present invention provides an air secondary battery comprising: an air cathode which has an air cathode layer containing a conductive material and an air cathode current collector which collects current of the air cathode layer; and an anode which has an anode layer containing an anode active material and an anode current collector which collects current of the anode layer; wherein the air cathode layer and the anode layer are placed so as to face each other, and a permeation preventing layer, which is made of a nonaqueous polymer electrolyte and prevents permeation of oxygen generated in the air cathode layer at a time of charge, is formed on a surface of a side of the anode layer of the air cathode layer.

According to the present invention, the direction of movement of the oxygen generated in the air cathode layer at the time of charge can be controlled by providing the permeation preventing layer. As a result, the accumulation of bubbles of oxygen at the interface between the air cathode layer and the nonaqueous liquid electrolyte can be suppressed and the deterioration in charge-discharge properties can be suppressed.

In the above-described invention, it is preferable that the air cathode layer is formed at a position higher than the anode layer. This is because it has a structure in which the oxygen generated in the air cathode layer at the time of charge is easily evacuated.

In the above-described invention, it is preferable that the air cathode layer contains a nonaqueous polymer electrolyte, and the nonaqueous polymer electrolyte contained in the air cathode layer is fused with the nonaqueous polymer electrolyte contained in the permeation preventing layer at an interface between the air cathode layer and the permeation preventing layer. This is because the adhesion of the air cathode layer to the permeation preventing layer can be improved and the permeation of oxygen can be prevented more effectively.

In the above-described invention, it is preferable that the electrolyte layer made of the nonaqueous liquid electrolyte is formed between the permeation preventing layer and the anode layer. This is because the improvement in the ion conductivity can be contemplated while the permeation of oxygen is prevented.

In the above-described invention, the nonaqueous polymer electrolyte is preferably the nonaqueous gel polymer electrolyte. This is because the range of options to select materials is wide and the reduction in cost can be contemplated.

Further, the present invention provides a method for producing an air cathode body used for an air secondary battery comprising steps of: forming an air cathode layer using an air cathode layer forming composition which contains a conductive material; and forming a permeation preventing layer on the air cathode layer using a permeation preventing layer forming composition which contains a nonaqueous polymer electrolyte in a dissolved state.

According to the present invention, the direction of movement of the oxygen generated in the air cathode layer at the time of charge can be controlled by forming the permeation preventing layer on the surface of the air cathode layer. As a result, the accumulation of bubbles of oxygen at the interface between the air cathode layer and the nonaqueous liquid electrolyte can be suppressed and the deterioration in charge-discharge properties can be suppressed.

In the above-described invention, it is preferable that the air cathode layer forming composition contains a nonaqueous polymer electrolyte in a dissolved state. This is because the air cathode layer containing the nonaqueous polymer electrolyte can be obtained and the ionic conductivity can be improved.

In the above-described invention, it is preferable to perform a fusing treatment to fuse the nonaqueous polymer electrolyte contained in the air cathode layer to the nonaqueous polymer electrolyte contained in the permeation preventing layer at an interface between the air cathode layer and the permeation preventing layer in the step of forming the permeation preventing layer. This is because the adhesion of the air cathode layer to the permeation preventing layer can be improved and the permeation of oxygen can be prevented more effectively.

In the above-described invention, the fusing treatment is preferably a treatment using a solution. This is because the adhesion of the air cathode layer to the permeation preventing layer can be easily improved.

In the above-described invention, the fusing treatment is preferably a treatment using a heat press. This is because the adhesion of the air cathode layer to the permeation preventing layer can be easily improved.

Effect of the Invention

In the present invention, the effect that can suppress the deterioration in charge-discharge properties caused by the oxygen generated in an air cathode layer at the time of charge is achieved.

DESCRIPTION OF REFERENCE NUMERALS

1a Anode case
1b Air cathode case
2 Anode current collector
2a Anode lead
3 Anode layer
4 Air cathode layer
5 Air cathode current collector
5a Air cathode lead
6 Permeation preventing layer
7 Nonaqueous liquid electrolyte
8 Microporous membrane
9 Packing

BEST MODE FOR CARRYING OUT THE INVENTION

Hereinafter, the air secondary battery and the method for producing an air cathode body of the present invention will be described in detail.

A. Air Secondary Battery

First, the air secondary battery of the present invention will be described. According to the present invention, there is provided an air secondary battery which comprises an air cathode which has an air cathode layer containing a conductive material and an air cathode current collector which collects current of the air cathode layer, and an anode which has an anode layer containing an anode active material and an anode current collector which collects current of the anode layer, wherein the air cathode layer and the anode layer are placed so as to face each other, and a permeation preventing layer, which is made of a nonaqueous polymer electrolyte and prevents permeation of oxygen generated in the air cathode layer at a time of charge, is formed on the surface of a side of the anode layer of the air cathode layer.

According to the present invention, the direction of movement of the oxygen generated in the air cathode layer at the time of charge can be controlled by providing the permeation preventing layer. As a result, the accumulation of bubbles of oxygen at the interface between the air cathode layer and the nonaqueous liquid electrolyte can be suppressed and the deterioration in charge-discharge properties can be suppressed. In this regard, the air battery in which the carboxymethyl cellulose-based polymer layer is provided between the air cathode layer and the separator is disclosed in Patent Document 2 as described above. However, the air battery described in Patent Document 2 is an aqueous system-primary battery and is obviously different from the air secondary battery (nonaqueous system-secondary battery) of the present invention. Further, the deterioration in charge-discharge properties caused by the oxygen generated in the air cathode layer at the time of charge is neither described nor suggested in Patent Document 2.

Figure 1:
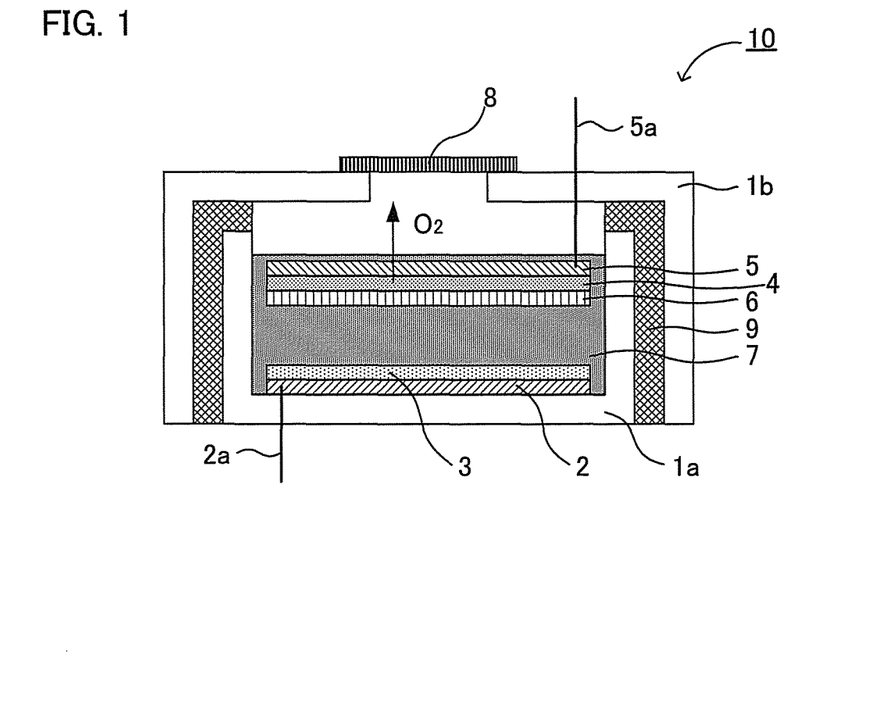
FIG. 1 is an outline cross-sectional view showing an example of the air secondary battery of the present invention.

FIG. 1 is an outline cross-sectional view showing an example of the air secondary battery of the present invention. An air secondary battery 10 shown in FIG. 1 comprises: an anode case 1a, an anode current collector 2 formed on the bottom surface of the inside of the anode case 1a, an anode lead 2a connected to the anode current collector 2, an anode layer 3 which is formed on the anode current collector 2 and contains the anode active material, an air cathode layer 4 which contains the conductive material, the catalyst, and the binder, an air cathode current collector 5 which collects current of the air cathode layer 4, an air cathode lead 5a connected to the air cathode current collector 5, a permeation preventing layer 6 formed on the surface of the side of the anode layer 3 of the air cathode layer 4, a nonaqueous liquid electrolyte 7, an air cathode case 1b which has a microporous membrane 8, and a packing 9 which seals contents with the anode case 1a and the air cathode case 1b. The present invention features that the permeation preventing layer 6 which is made of the nonaqueous polymer electrolyte and prevents the permeation of the oxygen generated in the air cathode layer 4 at the time of charge is formed on the surface of the side of the anode layer 3 of the air cathode layer 4. In this regard, the oxygen ($O_2$) generated in the air cathode layer 4 at the time of charge is passed through the air cathode current collector 5 having a porous structure and evacuated.

Hereinafter, each structure of the air secondary battery of the present invention will be described.

1. Air Cathode

First, the air cathode used in the present invention will be described. The air cathode to be used in the present invention has the air cathode layer containing the conductive material and an air cathode current collector which collects current of the air cathode layer.

(1) Air Cathode Layer

The air cathode layer used in the present invention contains at least the conductive material. If necessary, it may contain at least either the catalyst or the binder.

The conductive material used for the air cathode layer is not particularly limited as long as it has electrical conductivity. Examples thereof may include carbon materials. Further, these carbon materials may be a carbon material with or without a porous structure. In the present invention, it is preferable to use the carbon material with a porous structure. This is because the specific surface area is large and many reactive sites can be provided. Specific examples of the carbon material having a porous structure may include mesoporous carbons. On the other hand, specific examples of the carbon material without a porous structure include graphite, acetylene black, carbon nanotube, and carbon fiber. The content of the conductive material in the air cathode layer is, for example, preferably in the range of 10 to 99% by weight. This is because the reactive sites are decreased and the battery capacity may be reduced when the content of the conductive material is too low, and the content of the catalyst and the content of the binder are relatively decreased and a desired air cathode layer may not be obtained when the content of the conductive material is too high.

The air cathode layer used in the present invention may contain a catalyst that facilitates the reaction. This is because the electrode reaction is carried out more smoothly. Particularly, it is preferable that the conductive material is supported by the catalyst. Examples of the catalyst may include oxide catalysts such as manganese dioxide ($MnO_2$) or cerium dioxide ($CeO_2$); macrocyclic compounds such as phthalocyanine or porphyrin; and complexes in which transition metal (e.g., Co) is coordinated in the macrocyclic compounds. The content of the catalyst in the air cathode layer is, for example, in the range of 1 to 30% by weight. Particularly, it is preferably in the range of 5 to 20% by weight. This is because a sufficient catalytic function may not be exhibited when the content of the catalyst is too low, and the content of the conductive material is relatively decreased, the reactive sites are decreased, and the battery capacity may be reduced when the content of the catalyst is too high.

The air cathode layer to be used in the present invention may contain the binder which stabilizes the conductive material. Examples of the binder include fluorine containing binders such as polyvinylidene fluoride (PVDF) or polytetrafluoroethylene (PTFE). The content of the binder in the air cathode layer is, for example, 40% by weight or less. Particularly, it is preferably in the range of 1 to 10% by weight.

Further, it is preferable that the air cathode layer used in the present invention contains the nonaqueous polymer electrolyte. This is because the ionic conductivity of the air cathode layer can be improved. Further, it is preferable that the nonaqueous polymer electrolyte contained in the air cathode layer is fused with the nonaqueous polymer electrolyte contained in the permeation preventing layer as described below at the interface between the air cathode layer and the permeation preventing layer. This is because the adhesion of the air cathode layer to the permeation preventing layer can be improved and the permeation of oxygen can be prevented more effectively. In this regard, the nonaqueous polymer electrolyte will be specifically described in "3. Permeation preventing layer" to be described below. The content of the nonaqueous polymer electrolyte in the air cathode layer is, for example, 80% by weight or less. Particularly, it is preferably in the range of 10 to 70% by weight, and particularly preferably in the range of 30 to 60% by weight.

The thickness of the air cathode layer varies depending on factors such as the application of the air secondary battery and it is, for example, in the range of 2 to 500 μm. Particularly, it is preferably in the range of 5 to 300 μm.

(2) Air Cathode Current Collector

The air cathode current collector used in the present invention collects current of the air cathode layer. Examples of the material of the air cathode current collector may include metallic materials and carbon materials. Particularly, the carbon materials are preferable. This is because the carbon materials have the advantage of being: excellent in corrosion resistance, excellent in electron conductivity, and a high energy density per weight because the carbon material is lighter than metal. Examples of the carbon material may include carbon fiber (carbon fiber) and activated carbon (one obtained by activating a carbon plate). Particularly, the carbon fiber is preferable. This is because electrons can conduct through fiber and the electron conductivity is high. Examples of the carbon fiber may include PAN carbon fiber and pitch carbon fiber. On the other hand, examples of metallic materials may include stainless steel, nickel, aluminium, iron, and titanium.

The structure of the air cathode current collector in the present invention is not particularly limited as long as it can ensure desired electron conductivity. It may be a porous structure with gas diffusivity or a dense structure without gas diffusivity. Particularly, in the present invention, it is preferable that the air cathode current collector has the porous structure with gas diffusivity. This is because oxygen can be rapidly diffused. Specific examples of the porous structure may include a mesh structure, a nonwoven fabric structure, and a three-dimensional network structure having connecting pores. The porosity of the porous structure is not particularly limited. For example, it is preferably in the range of 20 to 99%.

Examples of the air cathode current collector using carbon fiber may include a carbon cloth and a carbon paper. The carbon cloth generally means one obtained by regularly knitting carbon fibers (corresponding to the mesh structure). On the other hand, the carbon paper generally means one obtained by allowing carbon fibers to be arranged at random (corresponding to the non-woven fabric structure). Further, the carbon cloth and the carbon paper may be subjected to sintering treatment or activation treatment. In the present invention, the carbon cloth and the carbon fiber may be superimposed upon each other for use. As a result, the air cathode current collector with improved mechanical strength can be obtained. On the other hand, specific examples of a metal current collector using the metallic materials may include metallic mesh.

The thickness of the air cathode current collector in the present invention is, for example, preferably in the range of 10 to 1000 μm. Particularly, it is preferably in the range of 20 to 400 μm. In the present invention, the battery case as described below may have the function of the air cathode current collector.

(3) Method for Forming an Air Cathode

The method for forming the air cathode in the present invention is not particularly limited as long as it can form the air cathode. An example of the method for forming the air cathode may include a method comprising the steps of first producing the air cathode layer forming composition which contains the conductive material, the catalyst, and the binder, applying the composition to the air cathode current collector, and drying.

2. Anode

Subsequently, the anode used in the present invention will be described. The anode used in the present invention has the anode layer containing the anode active material and the anode current collector which collects current of the anode layer.

(1) Anode Layer

The anode layer used in the present invention contains at least the anode active material. The anode active material is not particularly limited as long as it can absorb and release the metal ion. Examples thereof may include metal alone, alloys, metallic oxides, and metal nitrides. Examples of the metal ion include alkali metal ions. Examples of the alkali metal ion may include Li ions, Na ions, and K ions. Particularly, the Li ions are preferable. This is because a battery with a high energy density can be obtained.

Examples of the alloys with lithium element may include lithium aluminium alloys, lithium tin alloys, lithium lead alloys, and lithium silicon alloys. Examples of the metallic oxides with lithium element may include lithium titanium oxides. Examples of the metal nitrides containing lithium element may include lithium cobalt nitrides, lithium iron nitrides, and lithium manganese nitrides.

The anode layer in the present invention may contain only the anode active material or may contain at least either the conductive material or the binder in addition to the anode active material. For example, when the anode active material is in a foil form, the anode layer can contain only the anode active material. On the other hand, when the anode active material is in powder form, the anode layer can have the conductive material and the binder. In this regard, the content of the conductive material and the binder is the same as that described in "1. Air cathode" and the description will not be repeated here. It is preferable that the thickness of the anode layer is suitably selected according to the structure of a targeted air secondary battery.

(2) Anode Current Collector

The anode current collector used in the present invention collects current of the anode layer. The material of the anode current collector is not particularly limited as long as it has electrical conductivity. Examples thereof may include copper, stainless steel, and nickel. Examples of the shape of the anode current collector may include a foil shape, a plate shape, and a mesh (grid) shape. In the present invention, the battery case as described below may have the function of the anode current collector. It is preferable that the thickness of the anode current collector is suitably selected according to the structure of the targeted air secondary battery.

(3) Method for Forming an Anode

The method for forming the anode in the present invention is not particularly limited as long as it can form the anode. An example of the method for forming the anode may include a method comprising the steps of placing the anode active material in a foil form on the anode current collector and pressurizing. Another example of the method for forming the anode may include a method comprising the steps of producing an anode layer forming composition which contains the anode active material and the binder, applying the composition to the anode current collector, and drying.

3. Permeation Preventing Layer

Subsequently, the permeation preventing layer in the present invention will be described. The permeation preventing layer in the present invention is formed on the surface of the side of the anode layer of the air cathode layer, is made of the nonaqueous polymer electrolyte, and prevents the permeation of the oxygen generated in the air cathode layer at the time of charge. Usually, the permeation preventing layer has a degree of denseness to the extent that bubbles of oxygen cannot permeate. On the other hand, the permeation preventing layer is formed of the nonaqueous polymer electrolyte and thus the ion conductivity is sufficiently ensured.

Examples of the nonaqueous polymer electrolyte used in the present invention may include the nonaqueous gel polymer electrolyte and the nonaqueous intrinsic polymer electrolyte. Particularly, the nonaqueous gel polymer electrolyte is preferable. This is because the range of options to select materials is wide and the reduction in cost can be contemplated. Usually, the nonaqueous gel polymer electrolyte is a gel electrolyte made of a polymeric material and a nonaqueous liquid electrolyte. The polymeric material is not particularly limited as long as it can allow the nonaqueous liquid electrolyte as described below to gel. It is preferable that the material is excellent in oxidation resistance and reduction-resistance. Examples of the polymeric material may include polyvinylidene fluoride (PVDF), polyethylene oxide (PEO), polypropylene oxide (PPO), polyacrylonitrile (PAN), polymethylmethacrylate (PMMA), polyethyl methacrylate (PEMA), polybutyl methacrylate (PBMA), polyethylene glycol dimethyl ether (PEGDME), and copolymers thereof. The polymeric material is preferably a copolymer containing polyvinylidene fluoride, and more preferably a polyvinylidene fluoride-propylene hexafluoride copolymer (PVDF-HFP). This is because the copolymers are excellent in oxidation resistance and reduction-resistance.

On the other hand, the nonaqueous liquid electrolyte used for the nonaqueous gel polymer electrolyte usually contains a supporting electrolyte and an organic solvent (nonaqueous solvent). It is preferable that the supporting electrolyte is suitably selected according to the type of the metal ion conducting. For example, when the air secondary battery of the present invention is a lithium-air secondary battery, the supporting electrolyte is usually a lithium salt. Examples of the lithium salt may include inorganic lithium salts such as $LiPF_6$, $LiBF_4$, $LiClO_4$, or $LiAsF_6$; and organic lithium salts such as $LiCF_3SO_3$, $TAN(CF_3SO_2)_2$, $LiN(C_2F_5SO_2)_2$, or $LiC(CF_3SO_2)_3$. In the present invention, the lithium salt is preferably a lithium sulfonimide compound. It is preferably $LiN(CF_3SO_2)_2$ or $LiN(C_2F_5SO_2)_2$. Examples of the organic solvent may include ethylene carbonate (EC), propylene carbonate (PC), dimethyl carbonate (DMC), diethyl carbonate (DEC), ethyl methyl carbonate (EMC), butylene carbonate, γ-butyrolactone, sulfolane, acetonitrile, 1,2- dimethoxymethane, 1,3-dimethoxypropane, diethylether, tetrahydrofuran, 2-methyltetrahydrofuran, and mixtures thereof. It is preferable that the organic solvent has high oxygen solubility. This is because the dissolved oxygen can be efficiently used for reaction. In this regard, an ionic liquid (ordinary temperature molten salt) may be used as the solvent in the present invention. The concentration of the supporting electrolyte in the nonaqueous liquid electrolyte is, for example, preferably in the range of 0.5 to 3 mol/L.

Further, the ratio of the polymeric material and the nonaqueous liquid electrolyte which constitute the nonaqueous gel polymer electrolyte largely varies depending on factors such as the type of the polymeric material and it is not particularly limited. Usually, the polymeric material is added at the ratio of such a degree that the nonaqueous liquid electrolyte sufficiently gels. When the polymeric material is 100 parts by weight, the nonaqueous liquid electrolyte is, for example, in the range of 20 to 500 parts by weight. Particularly, it is preferably in the range of 50 to 200 parts by weight.

The permeation preventing layer in the present invention is a layer consisting of the nonaqueous polymer electrolyte. Further, the permeation preventing layer usually has a degree of denseness to the extent that bubbles of oxygen cannot permeate.

Figure 2A:
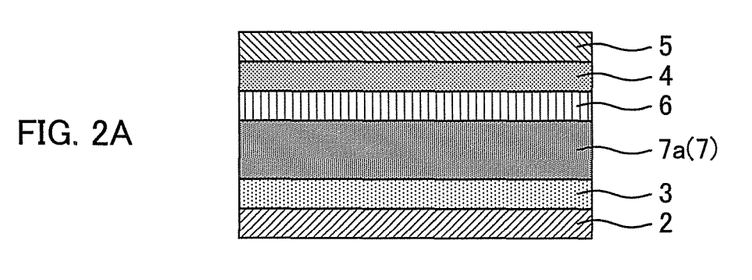
FIGS. 2A and 2B are each an outline cross-sectional view explaining the permeation preventing layer of the present invention.

The permeation preventing layer in the present invention is formed on the surface of the side of the anode layer of the air cathode layer. Usually, the permeation preventing layer is formed over the whole surface of the side of the anode layer of the air cathode layer. In the present invention, as shown in FIG. 2A, it is preferable that the permeation preventing layer 6 is formed on the surface of the side of the anode layer 3 of the air cathode layer 4, and further an electrolyte layer 7a which is made of the nonaqueous liquid electrolyte 7 is formed between the permeation preventing layer 6 and the anode layer 3. This is because the improvement in the ion conductivity can be contemplated while the permeation of oxygen is prevented. In this case, the thickness of the permeation preventing layer 6 is not particularly limited and it is, for example, 5 µm or more. Particularly, it is preferably in the range of 10 to 300 µm, and particularly preferably in the range of 20 to 100 µm. This is because the permeation of oxygen cannot be prevented when the thickness is too small and oxygen permeation preventing properties are not changed and the ion conductivity may be decreased when the thickness is too large. As for the nonaqueous liquid electrolyte 7 which constitutes the electrolyte layer 7a, the kind as the nonaqueous liquid electrolyte used for the nonaqueous gel polymer electrolyte of the permeation preventing layer 6 can be used. It is preferable to impregnate the air cathode layer 4 with the nonaqueous liquid electrolyte 7 as shown in FIG. 1.

Figure 2B:
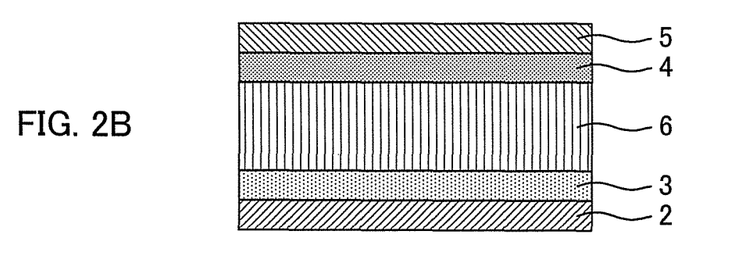

In the present invention, as shown in FIG. 2B, the permeation preventing layer 6 is formed on the surface of the side of the anode layer 3 of the air cathode layer 4, and further the permeation preventing layer 6 may be in contact with the anode layer 3. In other words, the permeation preventing layer 6 may be formed so as to fill in between the air cathode layer 4 and the anode layer 3. When it has such a structure, it is not necessary to use the nonaqueous liquid electrolyte. Therefore, the air secondary battery with high safety can be provided. In this case the thickness of the permeation preventing layer 6 is, for example, preferably in the range of 10 to 300 µm.

Further, the permeation preventing layer in the present invention contains the nonaqueous polymer electrolyte. As described above, it is preferable that the air cathode layer contains the nonaqueous polymer electrolyte. In this case, it is preferable that the nonaqueous polymer electrolyte contained in the permeation preventing layer is fused with the nonaqueous polymer electrolyte contained in the air cathode layer at the interface between the air cathode layer and the permeation preventing layer. This is because the adhesion of the permeation preventing layer and the air cathode layer can be improved and the permeation of oxygen can be prevented more effectively. In the present invention, the nonaqueous polymer electrolyte contained in the permeation preventing layer and the nonaqueous polymer electrolyte contained in the air cathode layer may be the same or different. It is preferable that they are the same. This is because the adhesion can be further improved. The nonaqueous polymer electrolytes being fused can be confirmed by observing with an SEM (scanning electron microscope).

4. Positional Relationship of the Air Cathode and the Anode

Figure 3A:
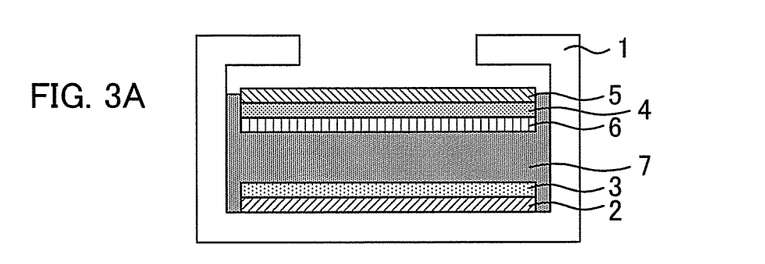
FIGS. 3A and 3B are each an outline cross-sectional view explaining the positional relationship of the air cathode and the anode.
Figure 3B:
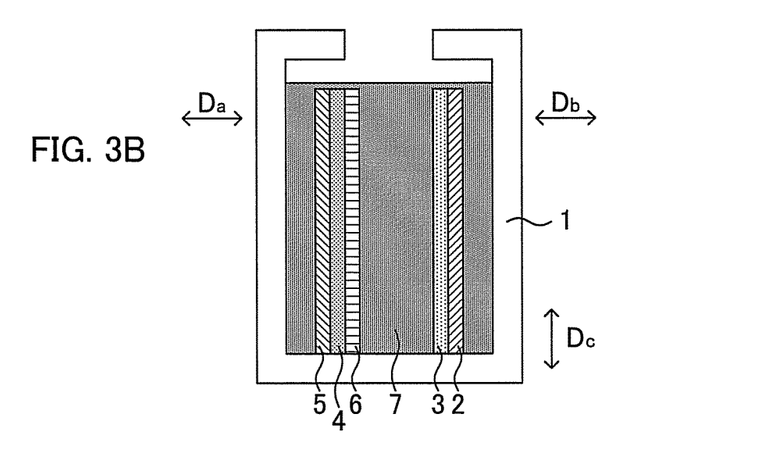

In the present invention, the air cathode layer of the air cathode and the anode layer of the anode are placed so as to face each other. The positional relationship of the air cathode and the anode is not particularly limited as long as it can suppress the deterioration in charge-discharge properties caused by the oxygen generated in the air cathode layer at the time of charge. Particularly, in the present invention, it is preferable that the air cathode layer 4 is formed at the position higher than the anode layer 3 as shown in FIG. 3A. This is because it has a structure in which the oxygen generated in the air cathode layer 4 at the time of charge is easily evacuated. On the other hand, in the present invention, the air cathode layer 4 and the anode layer 3 may be formed so that a normal direction $D_a$ of the surface of the air cathode layer 4 and a normal direction $D_b$ of the surface of the anode layer 3 are substantially perpendicular to a vertical direction $D_c$ as shown in FIG. 3B.

5. Battery Case

Subsequently, the battery case used in the present invention will be described. The shape of the battery case used in the present invention is not particularly limited as long as it can house the air cathode, the permeation preventing layer, and the anode. Specific examples thereof may include a coin type, a flat plate type, a cylindrical type, and a laminated type. Further, the battery case may be an atmosphere releasing battery case or may be a hermetically-sealed battery case. The atmosphere releasing battery case is a battery case which can come into contact with the atmosphere as shown in FIG. 1 as described above. On the other hand, when the battery case is the hermetically-sealed battery case, it is preferable that a gas (air) introducing pipe and an exhaust pipe are provided in the hermetically-sealed battery case. In this case, the gas to be introduced and evacuated has preferably a high oxygen concentration, and more preferably pure oxygen. Further, it is preferable that the oxygen concentration is increased at the time of discharge and the oxygen concentration is decreased at the time of charge.

6. Air Secondary Battery

It is preferable that the air secondary battery of the present invention has the separator which supports the nonaqueous liquid electrolyte between the permeation preventing layer and the anode layer. This is because the air secondary battery with higher safety can be obtained. Examples of the separator may include porous membranes such as polyethylene or polypropylene; and nonwoven fabrics such as resin nonwoven fabrics or glass fiber nonwoven fabrics. It is preferable that the thickness of the separator is suitably selected according to factors such as the application of the air secondary battery.

The type of the air secondary battery of the present invention varies depending on the type of the metal ion to be used as a conductive ion. Examples of the metal ion include alkali metal ions. Further, examples of the alkali metal ion may include Li ions, Na ions, and K ions. Particularly, the Li ions are preferable. That is, examples of the type of the air secondary battery of the present invention may include lithium-air secondary batteries, sodium air secondary batteries, and potassium air secondary batteries. Particularly, the lithium-air secondary batteries are preferable. This is because a battery with a high energy density can be obtained. Further, examples of the application of the air secondary battery of the present invention may include in-car application, stationary power source application, and domestic power source application.

B. Method for Producing an Air Cathode Body

Subsequently, the method for producing an air cathode body in the present invention will be described. The method for producing an air cathode body of the present invention used for an air secondary battery comprises the steps of: forming an air cathode layer using an air cathode layer forming composition which contains a conductive material; and forming a permeation preventing layer on the air cathode layer using a permeation preventing layer forming composition which contains a nonaqueous polymer electrolyte in a dissolved state.

According to the present invention, the direction of movement of the oxygen generated in the air cathode layer at the time of charge can be controlled by forming the permeation preventing layer on the surface of the air cathode layer. As a result, the accumulation of bubbles of oxygen at the interface between the air cathode layer and the nonaqueous liquid electrolyte can be suppressed and the deterioration in charge-discharge properties can be suppressed.

Figure 4A:
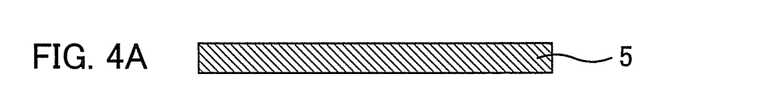
FIGS. 4A to 4C are an outline cross-sectional view showing an example of a method for producing an air cathode body of the present invention.
Figure 4B:
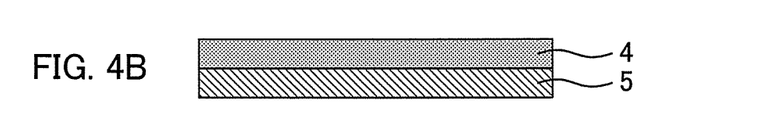
Figure 4C:
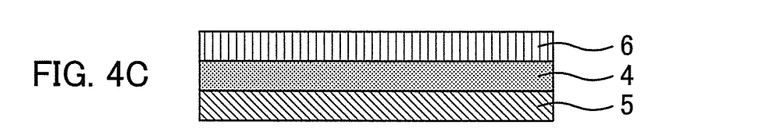

FIGS. 4A to 4C are an outline cross-sectional view showing an example of a method for producing an air cathode body of the present invention. In the method for producing an air cathode body shown in FIGS. 4A to 4C, the air cathode current collector 5 is first prepared (FIG. 4A). Next, the air cathode layer forming composition which contains the conductive material, the catalyst, and the binder is applied to the air cathode current collector 5 and dried to form the air cathode layer 4 (FIG. 4B). Then, the permeation preventing layer forming composition which contains the nonaqueous polymer electrolyte in the dissolved state is applied to the air cathode layer 4 and dried to form the permeation preventing layer 6 (FIG. 4C). As a result, the air cathode body having the air cathode current collector 5, the air cathode layer 4, and the permeation preventing layer 6 can be obtained.

Hereinafter, the method for producing an air cathode body of the present invention will be described for each step.

1. Step of Forming the Air Cathode Layer

The step of forming the air cathode layer in the present invention is a step of forming the air cathode layer using the air cathode layer forming composition which contains the conductive material. The air cathode layer forming composition contains at least the conductive material. If necessary, it may contain at least either the catalyst or the binder. The content of these materials is the same as that described in "A. Air secondary battery". Usually, the air cathode layer forming composition contains the solvent. Examples of the solvent include acetone, N-methyl-2-pyrrolidone (NMP), N,N-dimethylacetamide (DMA), N,N-dimethylformamide (DMF), methyl ethyl ketone (MEK), and tetrahydrofuran (THF).

In the above-described invention, it is preferable that the air cathode layer forming composition contains the nonaqueous polymer electrolyte in the dissolved state. This is because the air cathode layer containing the nonaqueous polymer electrolyte can be obtained and the ionic conductivity can be improved. Further, the adhesion of the air cathode layer to the permeation preventing layer can be improved by performing the fusing treatment as described below and the permeation of oxygen can be prevented more effectively. In the present invention, the term "dissolved state of the nonaqueous polymer electrolyte" means a state that the nonaqueous polymer electrolyte is dissolved in a diluent solvent. For example, when the nonaqueous polymer electrolyte is the nonaqueous gel polymer electrolyte, the dissolved state of the nonaqueous gel polymer electrolyte means a state that the polymeric material, the nonaqueous liquid electrolyte, and the diluent solvent are mixed. In this regard, it is preferable that the type of the diluent solvent is suitably selected according to factors such as the type of the polymeric material.

When the nonaqueous polymer electrolyte is the nonaqueous gel polymer electrolyte, the air cathode layer forming composition may not have the supporting electrolyte. This is because when the air secondary battery having the nonaqueous liquid electrolyte is produced, the metal ion in the nonaqueous liquid electrolyte can permeate a gel without the supporting electrolyte (gel made of the polymeric material and the nonaqueous solvent) even if it does not contain the supporting electrolyte, as shown in FIG. 1. In this regard, the permeation is usually formed until it reaches a state of equilibrium.

In the present invention, the air cathode layer is usually formed by applying the air cathode layer forming composition and drying. The coating method is not particularly limited and a general coating method can be used. Further, a coated substrate to which the air cathode layer forming composition is applied is not particularly limited and it is usually the air cathode current collector. That is, the air cathode having the air cathode current collector and the air cathode layer is produced by applying the air cathode layer forming composition on the air cathode current collector and drying.

2. Step for Forming a Permeation Preventing Layer

Subsequently, the step for forming a permeation preventing layer in the present invention will be described. The step of forming the permeation preventing layer in the present invention is a step of forming the permeation preventing layer on the air cathode layer using the permeation preventing layer forming composition which contains the nonaqueous polymer electrolyte in the dissolved state.

The permeation preventing layer forming composition contains the nonaqueous polymer electrolyte in the dissolved state. The content of the nonaqueous polymer electrolyte is the same as that described in "A. Air secondary battery". Usually, the permeation preventing layer forming composition contains the diluent solvent. The content of the diluent solvent is the same as that described in the step of forming the air cathode layer. When the nonaqueous polymer electrolyte is the nonaqueous gel polymer electrolyte, the permeation preventing layer forming composition may not have the supporting electrolyte. This is because when the air secondary battery having the nonaqueous liquid electrolyte is produced, the metal ion in the nonaqueous liquid electrolyte can permeate the gel without the supporting electrolyte (gel made of the polymeric material and the nonaqueous solvent) even if it does not contain the supporting electrolyte, as shown in FIG. 1. In this regard, the permeation is usually formed until it reaches the state of equilibrium.

As described above, it is preferable that the air cathode layer forming composition contains the nonaqueous polymer electrolyte in the dissolved state. As a result, the air cathode layer containing the nonaqueous polymer electrolyte can be obtained. In this case, it is preferable to perform the fusing treatment to fuse the nonaqueous polymer electrolyte contained in the air cathode layer to the nonaqueous polymer electrolyte contained in the permeation preventing layer at the interface between the air cathode layer and the permeation preventing layer in the step of forming the permeation preventing layer. This is because the adhesion of the air cathode layer to the permeation preventing layer can be improved and the permeation of oxygen can be prevented more effectively.

An example of the fusing treatment may include the treatment using a solution. This is a method for fusing the nonaqueous polymer electrolytes using a solvent (diluent solvent) which dissolves the nonaqueous polymer electrolyte. Here, upon describing it again using FIGS. 4A to 4C, the air cathode layer forming composition which contains the conductive material, the polymeric material, the nonaqueous liquid electrolyte, and the diluent solvent (e.g., acetone) is first applied to the air cathode current collector 5 and dried to form the air cathode layer 4 (FIG. 4B). Next, the permeation preventing layer forming composition which contains the polymeric material, the nonaqueous liquid electrolyte, and the diluent solvent (e.g., acetone) is applied to the obtained air cathode layer 4. In this case, the nonaqueous gel polymer electrolyte of the air cathode layer 4 which has been already dried is dissolved again by the diluent solvent of the permeation preventing layer forming composition. As a result, the nonaqueous gel polymer electrolytes can be fused at the interface. Thereafter, the permeation preventing layer 6 is formed by drying (FIG. 4C).

Figure 5A:
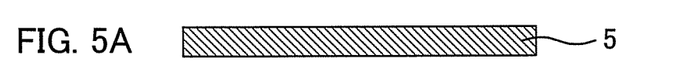
FIGS. 5A to 5E are an outline cross-sectional view showing another example of the method for producing an air cathode body of the present invention.
Figure 5B:
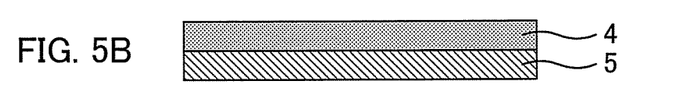
Figure 5C:
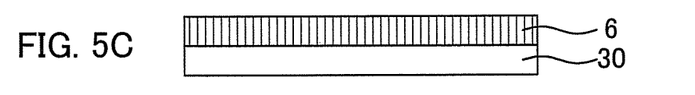
Figure 5D:
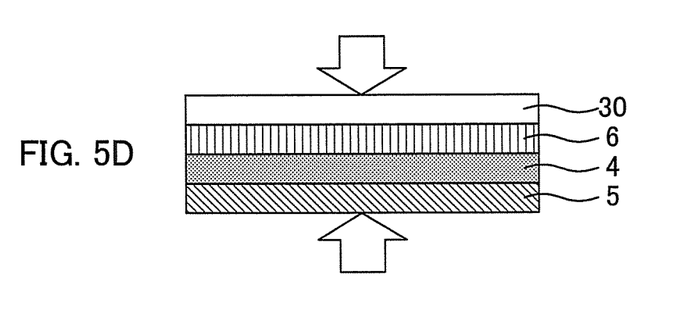
Figure 5E:
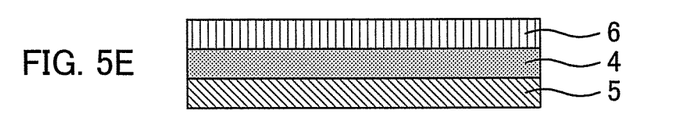

Another example of the fusing treatment may include the treatment using a heat press. This is a method for fusing the nonaqueous polymer electrolytes with heat energy. For example, the air cathode layer containing the nonaqueous polymer electrolyte and the permeation preventing layer containing the nonaqueous polymer electrolyte are formed. Thereafter, the nonaqueous gel polymer electrolytes can be fused at the interface by performing a flat heat press. When the heat press is performed, the permeation preventing layer can be formed by the transfer method. Here, the transfer method will be described using FIGS. 5A and 5E. In the method for producing an air cathode body as shown in FIGS. 5A and 5E, the air cathode current collector 5 is first prepared (FIG. 5A). Next, the air cathode layer forming composition which contains the conductive material, the polymeric material, the nonaqueous liquid electrolyte, and the diluent solvent is applied to the air cathode current collector 5 and dried to form the air cathode layer 4 (FIG. 5B). Then, the permeation preventing layer forming composition which contains the polymeric material, the nonaqueous liquid electrolyte, and the diluent solvent is applied to a transfer substrate 30 and dried to form the permeation preventing layer 6 (FIG. 5C). Subsequently, the permeation preventing layer 6 and the air cathode layer 4 are bonded, followed by performing a heat press (FIG. 5D). Finally, the air cathode body which has the air cathode current collector 5, the air cathode layer 4, and the permeation preventing layer 6 is obtained by peeling the transfer substrate 30 (FIG. 5E).

3. Others

The method for producing an air cathode body of the present invention has the steps of forming the air cathode layer and forming the permeation preventing layer. In the present invention, the method for producing an air secondary battery in which the obtained air cathode body is used can be provided. With reference to a step of forming the anode and a step of assembling the battery, they are the same as steps of the production of a general air secondary battery and thus the description will not be repeated here.

In this regard, the present invention is not limited to the embodiments. The embodiments are illustrations and any variations and modifications which have the substantially same structure as the technical idea described in claims of the present invention and achieve the same operation effect are encompassed in the technical scope of the present invention.

EXAMPLES

Hereinafter, the present invention will be more specifically described with reference to Examples.

Example 1

Production of an Air Cathode Body

First, 80 parts by weight of Ketjen black (manufactured by KETJEN BLACK INTERNATIONAL COMPANY), 15 parts by weight of electrolytic manganese dioxide (manufactured by Kojundo Chemical Laboratory Co., Ltd.), and 100 parts by weight of PVDF solution (manufactured by KUREHA CORPORATION) were mixed and NMP (N-methylpyrrolidone, manufactured by Kanto Chemical Co., Inc.) was added thereto. The resultant was mixed with a kneading machine and the air cathode layer forming composition was obtained. Thereafter, the air cathode layer forming composition was applied to a carbon paper (air cathode current collector, TGP-H-090®, manufactured by Toray Industries, Inc., 0.28 mm in thickness), followed by drying to remove NMP. As a result, the air cathode layer was formed on the air cathode current collector.

Then, 5 parts by weight of PVDF-HFP powder (Kynar, registered trademark) was dissolved in 50 parts by weight of acetone. Further, 10 parts by weight of nonaqueous liquid electrolyte obtained by dissolving $(CF_3SO_2)_2NLi$ in propylene carbonate (PC) at a concentration of 1 M was added thereto and the permeation preventing layer forming composition was produced. Thereafter, the permeation preventing layer forming composition was applied to the surface of the obtained air cathode layer by the doctor blade method using an applicator with a gap thickness of 300 μm, followed by drying to remove acetone. Further, procedures for coating and drying were repeated once more. As a result, the permeation preventing layer was formed on the air cathode layer. Thereafter, it was punched with a diameter of φ18 mm to obtain the air cathode body. In this regard, the obtained permeation preventing layer has a degree of denseness to the extent that oxygen cannot permeate.

(Assembly of the Lithium-Air Secondary Battery)

Figure 6:
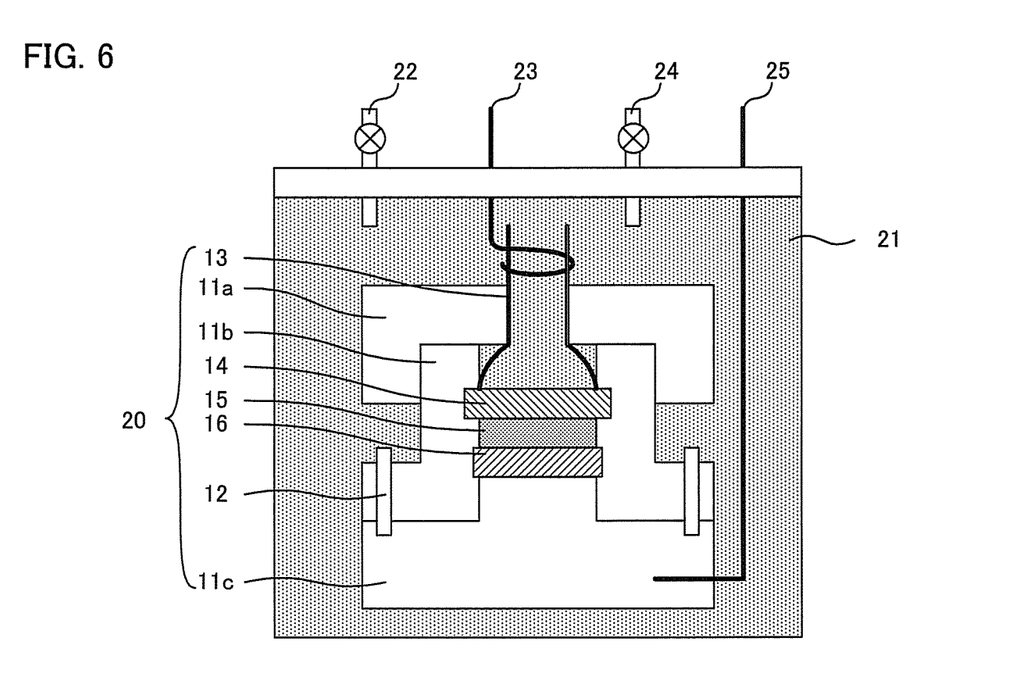
FIG. 6 is an outline cross-sectional view showing a cell for evaluation used in Example 1.

Subsequently, the lithium-air secondary battery was produced using the obtained air cathode body (refer to FIG. 6). In this regard, the whole assembly of the battery was performed in an argon box (dew point: −40° C. or less). Here, a lithium-air secondary battery 20 has battery cases 11a and 11b made of Teflon (registered trademark) and a battery case 11c made of SUS. In this regard, the battery case 11b and the battery case 11c are joined with a bolt 12. Further, the battery case 11a has an opening portion which supplies oxygen and a hollow-shaped current discharging portion 13 is provided in the opening portion. Furthermore, the air cathode body obtained by the above-described method was used for the air cathode body made of the air cathode 14 and the permeation preventing layer 15. Metal lithium (manufactured by Honjo Metal Co., Ltd., 200 μm in thickness, and 16 mm in diameter) was used for an anode layer 16.

(Production of the Cell for Evaluation)

Subsequently, the current discharging portion 13 made of SUS was connected to an air cathode lead 23, the battery case 11c made of SUS was connected to an anode lead 25, and the lithium-air secondary battery 20 was housed in a glass vessel 21 with a volume of 1000 cc. Thereafter, the glass vessel 21 was hermetically-sealed and then the glass vessel 21 sealed was taken out from the argon box. Then, oxygen was introduced through a gas introducing portion 22 from a gas cylinder of oxygen. Simultaneously, gas was evacuated from an exhaust portion 24. The argon atmosphere in the glass vessel was changed to the oxygen atmosphere. As a result, the cell for evaluation was obtained.

Example 2

First, 80 parts by weight of Ketjen black (manufactured by KETJEN BLACK INTERNATIONAL COMPANY), 15 parts by weight of electrolytic manganese dioxide (manufactured by Kojundo Chemical Laboratory Co., Ltd.), and 120 parts by weight of PVDF-HFP powder (Kynar, registered trademark) were dissolved in 3200 parts by weight of acetone. The resultant was further mixed with a polymer solution containing 120 parts by weight of nonaqueous liquid electrolyte obtained by dissolving $(CF_3SO_2)_2NLi$ in propylene carbonate (PC) at a concentration of 1 M. Acetone for dilution was added the resulting mixture, which was mixed with the kneading machine and the air cathode layer forming composition was obtained.

The cell for evaluation was produced in the same manner as described in Example 1 except that the air cathode layer forming composition was used. In this regard, the obtained permeation preventing layer has a degree of denseness to the extent that oxygen cannot permeate. In the case of the present example, both of the air cathode layer forming composition and the permeation preventing layer forming composition contain the nonaqueous polymer electrolyte. Therefore, when the permeation preventing layer forming composition is applied, acetone contained in the composition redissolves the dried nonaqueous polymer electrolyte which is contained in the air cathode layer forming composition. As a result, the nonaqueous polymer electrolyte contained in the air cathode layer is fused with the nonaqueous polymer electrolyte contained in the permeation preventing layer at the interface between the air cathode layer and the permeation preventing layer. This leads to high adhesion.

Example 3

First, 80 parts by weight of Ketjen black (manufactured by KETJEN BLACK INTERNATIONAL COMPANY), 15 parts by weight of electrolytic manganese dioxide (manufactured by Kojundo Chemical Laboratory Co., Ltd.), and 120 parts by weight of PVDF-HFP powder (Kynar, registered trademark) were dissolved in 3200 parts by weight of acetone. The resultant was further mixed with a polymer solution containing 120 parts by weight of nonaqueous liquid electrolyte obtained by dissolving $(CF_3SO_2)_2NLi$ in propylene carbonate (PC) at a concentration of 1 M. Acetone for dilution was added the resulting mixture, which was mixed with the kneading machine and the air cathode layer forming composition was obtained. Thereafter, the air cathode layer forming composition was applied to a carbon paper (air cathode current collector, TGP-H-090®, manufactured by Toray Industries, Inc., 0.28 mm in thickness), followed by drying to remove NMP. As a result, the air cathode layer was formed on the air cathode current collector.

Then, 5 parts by weight of PVDF-HFP powder (Kynar, registered trademark) was dissolved in 50 parts by weight of acetone. Further, 10 parts by weight of nonaqueous liquid electrolyte obtained by dissolving $(CF_3SO_2)_2NLi$ in propylene carbonate (PC) at a concentration of 1 M was added thereto and the permeation preventing layer forming composition was produced. Thereafter, the permeation preventing layer forming composition was applied to PET sheet by the doctor blade method using the applicator with a gap thickness of 300 μm, followed by drying to remove acetone. Further, procedures for coating and drying were repeated once more. As a result, the permeation preventing layer was formed. Subsequently, the air cathode layer formed on the air cathode current collector and the permeation preventing layer formed on PET sheet were bonded, followed by performing a flat heat press. Thereafter, the PET sheet was peeled and punched with a diameter of 418 mm to obtain the air cathode body. The cell for evaluation was produced in the same manner as described in Example 1 except that the air cathode body was used. In this regard, the obtained permeation preventing layer has a degree of denseness to the extent that oxygen cannot permeate. In the case of the present example, both of the air cathode layer forming composition and the permeation preventing layer forming composition contain the nonaqueous polymer electrolyte. Therefore, when the flat heat press is performed, the nonaqueous polymer electrolyte contained in the air cathode layer is fused with the nonaqueous polymer electrolyte contained in the permeation preventing layer at the interface between the air cathode layer and the permeation preventing layer. This leads to high adhesion.

Examples 4 to 6

Figure 7:
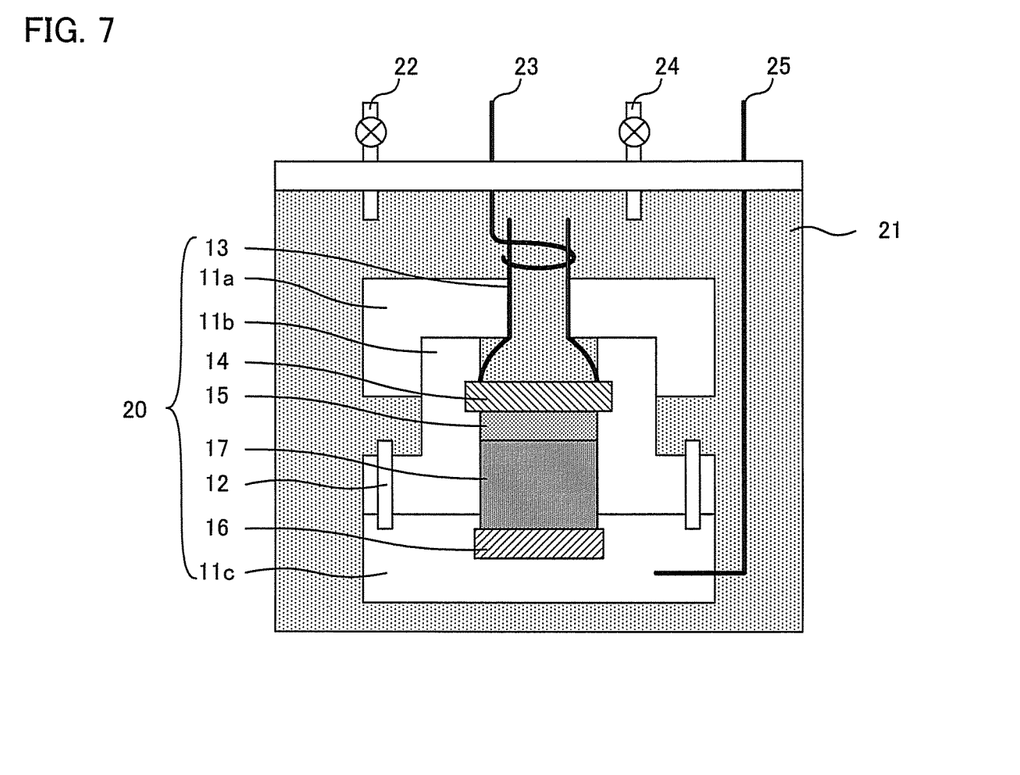
FIG. 7 is an outline cross-sectional view showing the cell for evaluation used in Example 4.

The cell for evaluation was produced in the same manner as described in Examples 1 to 3 except that an electrolyte layer 17 made of the nonaqueous liquid electrolyte obtained by dissolving $(CF_3SO_2)_2NLi$ in propylene carbonate (PC) at a concentration of 1 M was provided between the permeation preventing layer 15 and the anode layer 16 (refer to FIG. 7).

Comparative Example 1

The cell for evaluation was produced in the same manner as described in Example 4 except that a polyethylene microporous separator (manufactured by Celgard, LLC.) was used in place of the permeation preventing layer 15.
[Evaluation]
In Examples 1 to 6 and Comparative example 1, the charge-discharge test was performed using the obtained cell for evaluation. Charge-discharge conditions are described below.

In this regard, as for the charge-discharge, the discharge starts first. The charge-discharge was performed using a thermostat bath at 25° C.
(1) Discharge with an electric current of 100 mA/(g-carbon) until the battery voltage reaches 2 V.
(2) Pause for 1 hour after the discharge.
(3) Charge with an electric current of 100 mA/(g-carbon) until the battery voltage reaches 4.3 V after the pause.

Here, the term "g-carbon" represents the weight of the powdered carbon. The obtained results are shown in Table 1.

TABLE 1

| | Discharged Capacity Maintenance Ratio (%) (Discharged Capacity in the 50th cycle/ Discharged Capacity in the 2nd cycle) |
|---|---|
| Example 1 | 61 |
| Example 2 | 65 |
| Example 3 | 68 |
| Example 4 | 70 |
| Example 5 | 72 |
| Example 6 | 75 |

TABLE 1-continued

| | Discharged Capacity Maintenance Ratio (%) (Discharged Capacity in the 50th cycle/ Discharged Capacity in the 2nd cycle) |
|---|---|
| Comparative Example 1 | 0 (0% in the 21st cycle) |

In Comparative example 1, the discharged capacity was rapidly decreased before and after the 20th cycle. Thereafter, the charge-discharge was hardly performed. When the cell for evaluation of Comparative example 1 was taken apart after the end of the charge-discharge test, it was confirmed that gas was present between the air cathode layer and the separator. For this reason, it is considered that the oxygen gas generated at the time of charge did not escape out of the system before and after the 20th cycle and remained between the air cathode layer and the separator, which resulted in making the resistance very high and making the movement of lithium ions impossible (namely, the charge-discharge could not be carried out).

On the other hand, in Examples 1 to 6, the deterioration in charge-discharge properties caused by the oxygen generated in an air cathode layer at the time of charge could be suppressed. Particularly, the discharged capacity maintenance ratios in Examples 4 to 6 were higher than those in Examples 1 to 3. This is considered to be due to the fact that the nonaqueous liquid electrolyte was abundantly present and then it was always easy for lithium ions to move and the interfacial resistance of the anode layer (Li metal) to the nonaqueous liquid electrolyte was much lower. Further, from results of Examples 1 to 3 and results of Examples 4 to 6, it was confirmed that the discharged capacity maintenance ratio was increased by improving the adhesion of the air cathode layer to the permeation preventing layer.

The invention claimed is:

1. An air secondary battery comprising: an air cathode which has an air cathode layer containing a conductive material and an air cathode current collector which collects current of the air cathode layer; and an anode which has an anode layer containing an anode active material and an anode current collector which collects current of the anode layer; wherein the air cathode layer and the anode layer are placed so as to face each other, and a permeation preventing layer which is made of a nonaqueous polymer electrolyte and which prevents permeation of oxygen generated in the air cathode layer at a time of charge, is formed on a surface of a side of the anode layer of the air cathode layer; wherein the air cathode layer contains a nonaqueous polymer electrolyte, wherein the nonaqueous polymer electrolyte contained in the air cathode layer is fused with the nonaqueous polymer electrolyte contained in the permeation preventing layer at an interface between the air cathode layer and the permeation preventing layer, and an electrolyte layer made of a nonaqueous liquid electrolyte is formed between the permeation preventing layer and the anode layer, wherein the permeation prevention layer is different from the electrolyte layer.

2. The air secondary battery according to claim 1, wherein the air cathode layer is formed at a position higher than the anode layer.

3. The air secondary battery according to claim 1, wherein the nonaqueous polymer electrolyte is a nonaqueous gel polymer electrolyte.

4. A method for producing an air cathode body used for an air secondary battery comprising:
    forming an air cathode layer using an air cathode layer forming composition which contains a conductive material and a nonaqueous polymer electrolyte;
    forming a permeation preventing layer on the air cathode layer using a permeation preventing layer forming composition which contains a nonaqueous polymer electrolyte in a dissolved state; and
    forming an electrolyte layer made of a nonaqueous liquid electrolyte on the permeation preventing layer,
    applying a fusing treatment to fuse the nonaqueous polymer electrolyte contained in the air cathode layer to the nonaqueous polymer electrolyte contained in the permeation preventing layer at an interface between the air cathode layer and the permeation preventing layer in the step of forming the permeation preventing layer is performed.

5. The method for producing an air cathode body according to claim 4, wherein the air cathode layer forming composition contains a nonaqueous polymer electrolyte in a dissolved state.

6. The method for producing an air cathode body according to claim 4, wherein the fusing treatment is a treatment using a solution.

7. The method for producing an air cathode body according to claim 4, wherein the fusing treatment is a treatment using a heat press.

8. The air secondary battery according to claim 1, further comprising a separator which supports the nonaqueous liquid electrolyte in the electrolyte layer made of the nonaqueous liquid electrolyte.

9. The method for producing an air cathode body according to claim 4, the electrolyte layer made of the nonaqueous liquid electrolyte is formed by supporting the nonaqueous liquid electrolyte with a separator in the step of forming the electrolyte layer.

* * * * *

UNITED STATES PATENT AND TRADEMARK OFFICE
CERTIFICATE OF CORRECTION

PATENT NO. : 8,632,920 B2
APPLICATION NO. : 12/676111
DATED : January 21, 2014
INVENTOR(S) : S. Nakanishi et al.

It is certified that error appears in the above-identified patent and that said Letters Patent is hereby corrected as shown below:

In the Specification

At column 8, line 60, change "TAN $(CF_3SO_2)_2$" to -- LiN $(CF_3SO_2)_2$ --

Signed and Sealed this
Twenty-fourth Day of June, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,632,920 B2  Page 1 of 1
APPLICATION NO. : 12/676111
DATED : January 21, 2014
INVENTOR(S) : Nakanishi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 310 days.

Signed and Sealed this
Twenty-second Day of September, 2015

Michelle K. Lee
*Director of the United States Patent and Trademark Office*